US011366755B2

(12) United States Patent
Mikami et al.

(10) Patent No.: US 11,366,755 B2
(45) Date of Patent: Jun. 21, 2022

(54) CONTROLLER AND INDUSTRIAL MACHINE

(71) Applicant: FANUC CORPORATION, Yamanashi (JP)

(72) Inventors: Kazuyuki Mikami, Yamanashi (JP); Hideo Ogino, Yamanashi (JP); Takenori Ono, Yamanashi (JP); Manabu Saitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 82 days.

(21) Appl. No.: 17/101,466

(22) Filed: Nov. 23, 2020

(65) Prior Publication Data

US 2021/0173775 A1    Jun. 10, 2021

(30) Foreign Application Priority Data

Dec. 5, 2019    (JP) .............................. JP2019-220079

(51) Int. Cl.
*G06F 12/0802*    (2016.01)
*G06F 3/06*    (2006.01)

(52) U.S. Cl.
CPC ........ *G06F 12/0802* (2013.01); *G06F 3/0604* (2013.01); *G06F 3/0655* (2013.01); *G06F 3/0679* (2013.01); *G06F 2212/452* (2013.01); *G06F 2212/72* (2013.01)

(58) Field of Classification Search
CPC .... G06F 3/0604; G06F 3/0655; G06F 3/0679; G06F 12/0802; G06F 2212/452; G06F 2212/72
See application file for complete search history.

(56) References Cited

U.S. PATENT DOCUMENTS 8,037,285 B1 * 10/2011 Thaik .................... G06F 9/3808
712/243
2018/0285112 A1 * 10/2018 Mekkat ............... G06F 9/30101

FOREIGN PATENT DOCUMENTS

JP    2005-266997    9/2005

OTHER PUBLICATIONS

J. Torrellas, Chun Xia and R. Daigle, "Optimizing instruction cache performance for operating system intensive workloads," Proceedings of 1995 1st IEEE Symposium on High Performance Computer Architecture, 1995, pp. 360-369, doi: 10.1109/HPCA.1995.386527. (Year: 1995).*

* cited by examiner

*Primary Examiner* — Eric T Oberly
(74) *Attorney, Agent, or Firm* — Wenderoth, Lind & Ponack, L.L.P.

(57) ABSTRACT

The controller that controls the industrial machine comprises a storage area that stores an operation program, a cache memory, a cache control unit, and an analysis unit, the analysis unit pre-reads a command subsequent to a command included in the operation program loaded in the cache memory, in a case where it is determined that an operation load on a CPU in a command included in the operation program is below a prescribed value, adds, to the command, a cache control command for loading of a subprogram into the cache memory in accordance with a predetermined condition, in a case where a subprogram call command is confirmed present, and makes a cache control request to the cache control unit, responsive to the added cache control command, and the cache control unit loads the subprogram in the cache memory, based on the cache control request.

6 Claims, 6 Drawing Sheets

CONTROLLER AND INDUSTRIAL MACHINE

This application is based on and claims the benefit of priority from Japanese Patent Application No. 2019-220079, filed on 5 Dec. 2019, the content of which is incorporated herein by reference.

BACKGROUND OF THE INVENTION

Field of the Invention

The present invention relates to a controller and an industrial machine.

Related Art

Industrial machines including a machine tool, an industrial robot and the like operate based on signals from controllers such as a numerical control device (CNC) and a robot controller. The controller is, for example, incorporated in the industrial machine and provided together with the industrial machine. The controller that controls the industrial machine stores an operation program for operation of the industrial machine. The operation program is, for example, a machining program in the case of the numerical control device, and is a robot program to control a robot in the case of the robot controller. The machining program includes a command to operate an axis, and numerical calculation, and the machining program is executed to machine a workpiece. Furthermore, the machining program is stored, for example, in a storage area such as a storage medium, and during machining processing, the numerical control device loads the machining program in a cache memory to execute the program. The robot program includes, for example, a command for a joint axis, and the robot program is executed to operate the robot. The robot program is also stored in a storage area such as a storage medium in the same manner as in the machining program, and when the robot is controlled, the robot controller loads the robot program in a cache memory to execute the program.

As an example to load the program in the cache memory, an instruction cache system is known which takes, in advance, instruction data of a program to be executed by a central processing unit from a main storage program memory into an instruction cache, and transfers the instruction data from the instruction cache to the central processing unit, characterized in that the instruction cache is constituted of two faces, the system comprising means for repeating an operation of fetching and executing, by the central processing unit, the instruction data from the instruction cache of one face in parallel with an operation of transferring instruction data of the next program from the main storage program memory to the instruction cache of the other face, and after the execution of the instruction data fetched from the instruction cache of the one face is ended, switching connection of the instruction cache of the one face and the instruction cache of the other face, and performing an operation of fetching and executing, by the central processing unit, the instruction data from the instruction cache of the other face in parallel with an operation of transferring the instruction data of the next program from the main storage program memory to the instruction cache of the one face, thus alternately switching between the one face and the other face of the instruction cache, wherein the program includes a program structure in which the program is divided into program pieces to be fitted within a capacity of one face of the instruction cache, and execution of the program in each program piece is completed without straddling over into another program piece, and each program piece is transferred as a unit to the instruction cache (see Japanese Unexamined Patent Application, Publication No. 2005-266997).

Patent Document 1: Japanese Unexamined Patent Application, Publication No. 2005-266997

SUMMARY OF THE INVENTION

Processing of loading a program in a cache memory and erasing the program from the cache memory is processing that requires time. Therefore, a mechanism capable of efficiently using the cache memory is required. Particularly, in a controller that controls an industrial machine such as a numerical control device, there exists a large amount of processing of calling another program in response to a command in a machining program. As an example, subprograms are frequently called in an automatic lathe. Therefore, with the current hardware constitution as it is, a mechanism of efficiently loading the machining program or the like in the cache memory is required.

According to an aspect of the present disclosure, provided is a controller that controls an industrial machine comprising a storage area that stores an operation program for operation of the industrial machine, a cache memory that stores the operation program read from the storage area, a cache control unit that controls writing into the cache memory and discarding, and an analysis unit that analyzes the operation program loaded in the cache memory, the analysis unit comprising an operation load determining section that determines whether an operation load on a CPU in a command included in the operation program is below a prescribed value, a call checking section that pre-reads a command subsequent to the command included in the operation program loaded in the cache memory, and checks whether a subprogram call command is present, in a case where the operation load determining section determines that the operation load is below the prescribed value, a cache control command adding section that adds, to the command, a cache control command for loading of the subprogram into the cache memory in accordance with a predetermined condition, in a case where the call checking section confirms presence of the subprogram call command, and a cache control requesting section that makes a cache control request for the cache memory to the cache control unit, responsive to the cache control command added by the cache control command adding section, the cache control unit comprising a cache control request processing section that loads the subprogram in the cache memory, based on the cache control request by the cache control requesting section.

According to an aspect, a controller and an industrial machine can be provided, which can efficiently perform processing by use of a cache memory.

DETAILED DESCRIPTION OF THE INVENTION

Embodiment

First, an embodiment of an aspect will be schematically described. In the present embodiment, a machine tool is illustrated as an industrial machine. Furthermore, in the present embodiment, a numerical control device is illustrated as a controller, and a machining program is illustrated as an operation program. The present embodiment relates to the numerical control device that executes machining program, and automatically adds a command to load a subprogram in a cache memory to a command with a low operation load, in a case where there is a call for the subprogram from the machining program.

Figure 1:
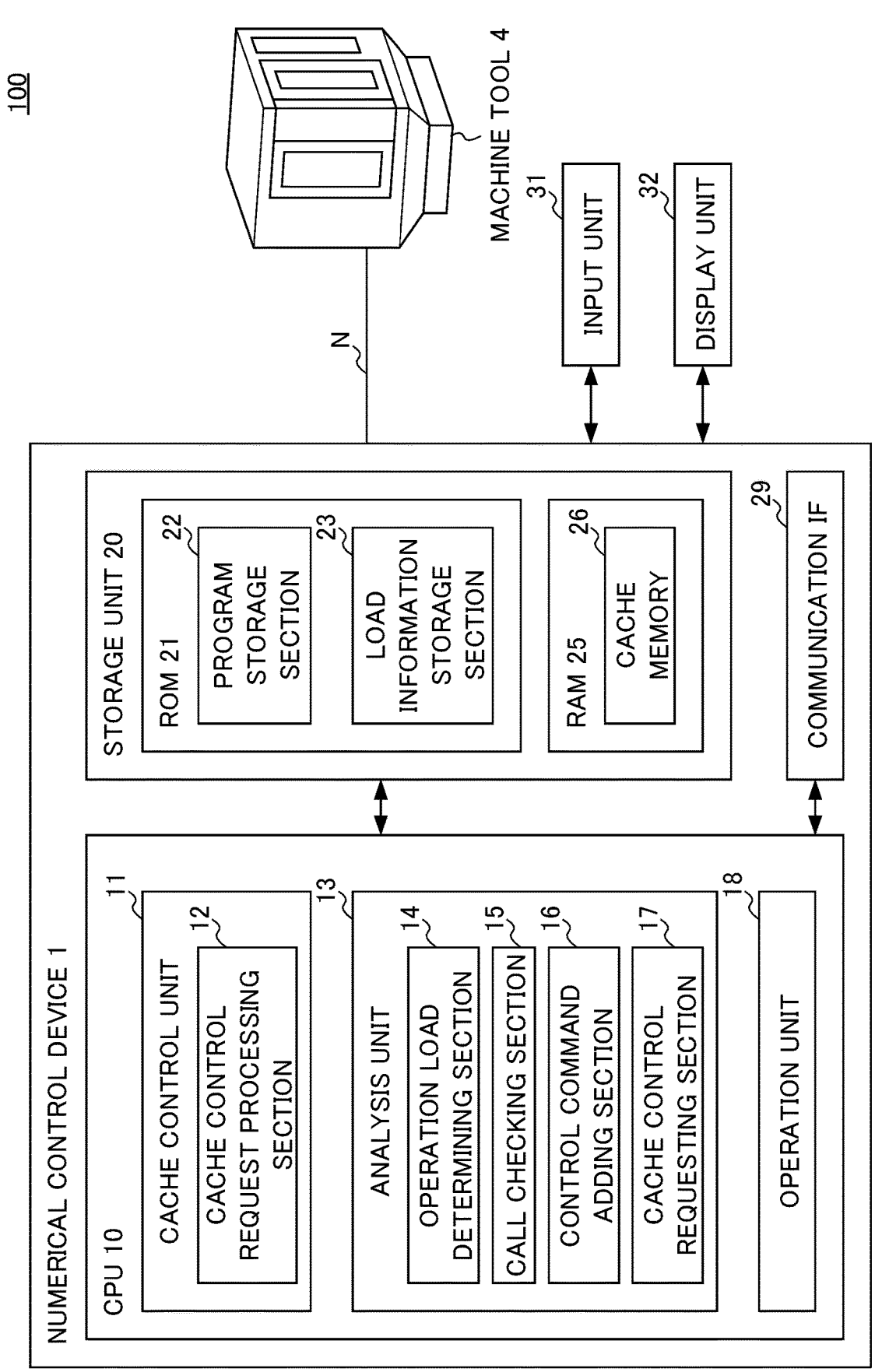
FIG. 1 is an entire constitution diagram of a production system in the present embodiment, and a function block diagram of a numerical control device.

Next, description will be made as to a constitution of a production system 100 according to the present embodiment, with reference to FIG. 1. The production system 100 shown in FIG. 1 comprises a numerical control device 1 and a machine tool 4. The numerical control device 1 is a controller that controls various operations to be performed by the machine tool 4, for example, to machine a workpiece. Furthermore, the numerical control device 1 and the machine tool 4 are connected to be communicable via a communication line N. There are not any restrictions on the communication line N as long as a signal can be transmitted and received via the line. Here, in the present embodiment, it is illustrated that the numerical control device 1 and the machine tool 4 are separate bodies. However, this embodiment is not restrictive, and may include a constitution where the numerical control device 1 and the machine tool 4 form an integral body and the numerical control device 1 is included in the machine tool 4.

The numerical control device 1 controls the machine tool 4. The numerical control device 1 comprises a CPU 10, a storage unit 20, and a communication interface (IF) 29. Furthermore, the numerical control device 1 is communicably connected to an input unit 31 and a display unit 32. The CPU 10 is a processor that controls the whole numerical control device 1. The CPU 10 loads, in a cache memory 26, a machining program stored in a program storage section 22 of the storage unit 20, and then executes the machining program in the cache memory 26 to control the whole numerical control device 1.

The storage unit 20 comprises a read only memory (ROM) 21, and a random access memory (RAM) 25. The ROM 21 comprises the program storage section 22 and a load information storage section 23. The program storage section 22 is a storage area that stores the machining program, any program such as a subprogram called by the machining program, and any other system program. Note that the CPU 10 may store, in advance, the machining program or the like in the program storage section 22 from a storage medium via external equipment (not shown). The load information storage section 23 stores an operation load on the CPU 10 for each command of the machining program. The operation load on the CPU 10 for each command will be described later in detail in description of a function of an after-mentioned operation load determining section 14.

The RAM 25 comprises the cache memory 26. The cache memory 26 is a high-speed storage device to store the machining program read from the program storage section 22, or the like. The cache memory 26 loads (caches) the program or the like in advance, and can therefore relatively reduce access to low-speed ROM 21 and achieve high-speed processing. The cache memory 26 is constituted of a plurality of divided zones as described later.

The CPU 10 comprises a cache control unit 11, an analysis unit 13, and an operation unit 18. The cache control unit 11, the analysis unit 13 and the operation unit 18 are function units in the CPU 10. The cache control unit 11 loads the machining program in the cache memory 26. The cache control unit 11 comprises a cache control request processing section 12. The cache control request processing section 12 loads, in the cache memory 26, the subprogram called from the machining program based on an after-mentioned cache control request. Furthermore, the cache control request processing section 12 erases, from the cache memory 26, a subprogram that is not required any more. The analysis unit 13 analyzes the machining program loaded in the cache memory 26. The analysis unit 13 comprises the operation load determining section 14, a call checking section 15, a control command adding section 16 (a cache control command adding section), and a cache control requesting section 17.

The operation load determining section 14 determines whether the operation load on the CPU 10 in the command included in the machining program is below a prescribed value. Here, the prescribed value is set in advance, and may be set, for example, by an operator. More specifically, the operation load determining section 14 may determine whether the operation load on the CPU 10 in the command included in the machining program is below the prescribed value, with reference to the load information storage section 23. The operation load determining section 14 can use, for example, a use ratio of the CPU 10 when determining the operation load on the CPU 10. For example, the load information storage section 23 may store, for each command, time required from start to end, a measured value of CPU use ratio information, and the like, and the operation load determining section 14 may determine that the operation load is low, in a case where the command has a CPU use ratio of a % or less, or the command has a CPU use ratio of b % or less and processing time of c milliseconds or more. Note that each of a, b and c is the prescribed value, and the value set in advance.

Alternatively, the operation load determining section 14 may use, for example, a feed rate of an axis movement command that is included in the machining program, when determining the operation load on the CPU 10. If the feed rate of the axis movement command is used, a smaller value of the feed rate indicates a lower operation load. Specifically, in a case where the command being analyzed by the analysis unit 13 is "G01X100.0F1000", an X-axis is a straight axis, a unit of a stroke is "mm", and 1000 indicates a movement rate "mm/min", and if the movement rate is d (d is a prescribed value) or less, it may be determined that the operation load is low. Note that if the command is associated with a rotary axis, the unit of the stroke is "deg", and the rate is "deg/min". Furthermore, when determining the operation load on the CPU 10, presence/absence of a waiting command (dwell) or waiting time (millisecond) of the waiting command may be used. If the waiting command is used, needless to say, the operation load decreases. Note that generally, if the machining program comprises a series of small blocks, a large amount of calculation processing is performed by use of the CPU 10, and hence the operation load tends to increase.

The call checking section 15 checks presence/absence of a subprogram call command subsequent to the command included in the machining program loaded in the cache memory 26, in a case where the operation load determining section 14 determines that the operation load of the command included in the machining program loaded in the cache memory 26 is below the prescribed value. The control command adding section 16 adds, to the command, a cache control command for the loading of the subprogram into the cache memory 26 in accordance with a predetermined condition, in a case where the call checking section 15 confirms presence of the subprogram call command. Here, the control command adding section 16 does not necessarily add, to the command, the cache control command for the loading of the subprogram into the cache memory 26, in the case where the call checking section 15 confirms presence of the subprogram call command. For example, if an analysis inhibition command (mask buffer) is present prior to the subprogram call command, the cache control command is not added.

Furthermore, the control command adding section 16 determines whether a designated subprogram is already loaded in the cache memory 26, and adds, to the command, the cache control command for loading of the subprogram from first data into the cache memory 26, in a case where the subprogram is not loaded. Additionally, the control command adding section 16 determines whether the designated subprogram is already loaded in the cache memory 26, and adds, to the command, a cache control command for loading of the subprogram from a call position (a designated position) into the cache memory 26, based on content of the subprogram call command, in a case where the subprogram is loaded. Here, the control command adding section 16 usually loads the first data. However, in a case where the call position is designated, it is sufficient for the control command adding section 16 to load the subprogram at and after the call position in the cache memory 26.

The cache control requesting section 17 makes a cache control request (a securing request) for the cache memory 26 to the cache control unit 11, responsive to the cache control command added by the control command adding section 16. Specifically, the cache control requesting section 17 makes the securing request for the cache memory 26 to the cache control unit 11, for the loading of the subprogram into the cache memory 26. Note that the cache control requesting section 17 makes, to the cache control unit 11, a request for cache deletion from the cache memory 26, in a case where the cache control command is the cache deletion request. The operation unit 18 executes axis control to operate the machine tool 4, based on the analyzed command transferred from the analysis unit 13.

The communication IF 29 is a communication control device constituted of a predetermined connector such as a connector for RS232C, to directly connect to the machine tool 4. The input unit 31 and the display unit 32 are, for example, a display/MDI unit. The display/MDI unit is a manual data input unit comprising a display, a keyboard and the like.

[Control Processing]

Figure 2:
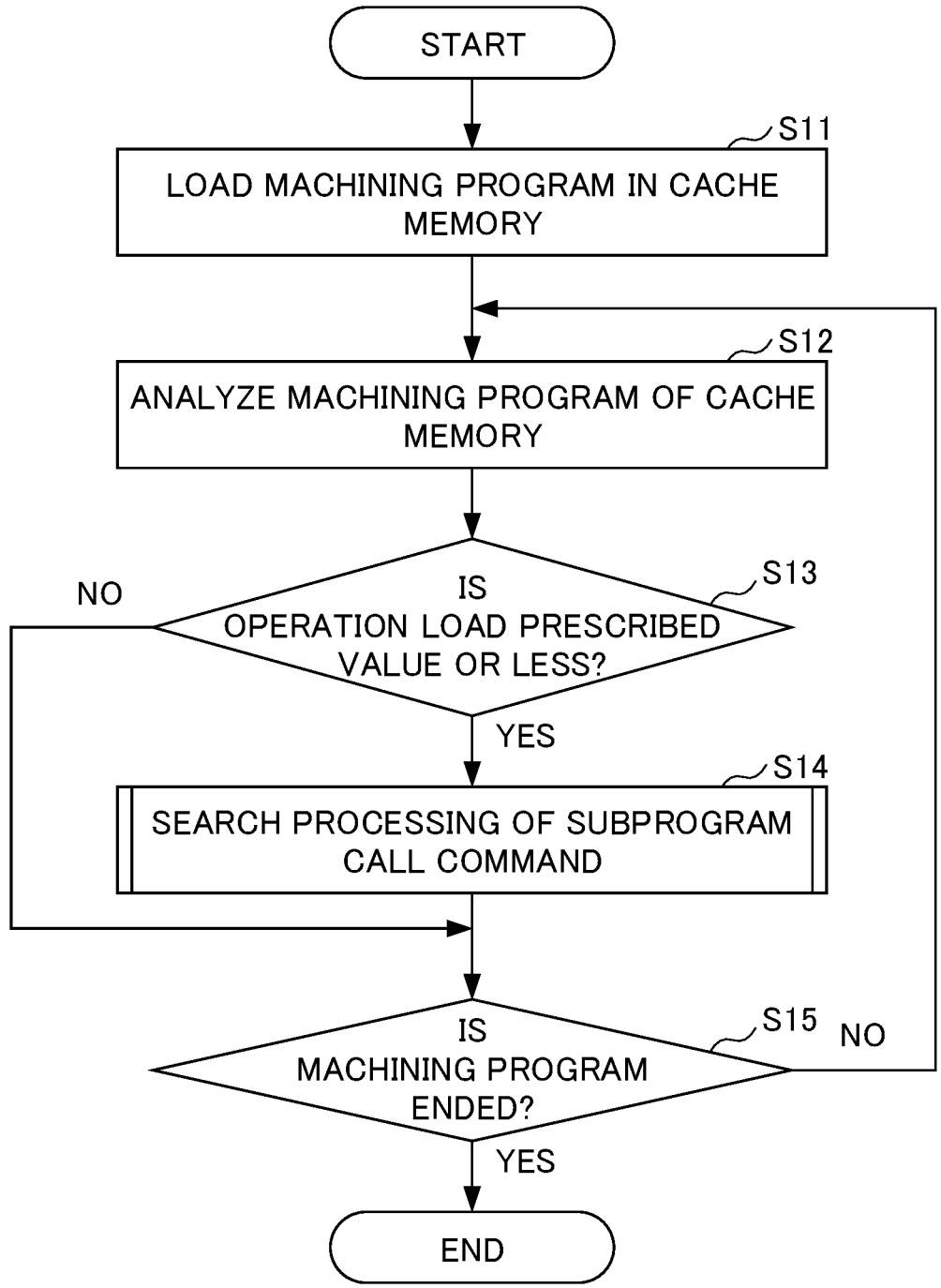
FIG. 2 is a flowchart showing control processing in the numerical control device in the present embodiment.
Figure 3:
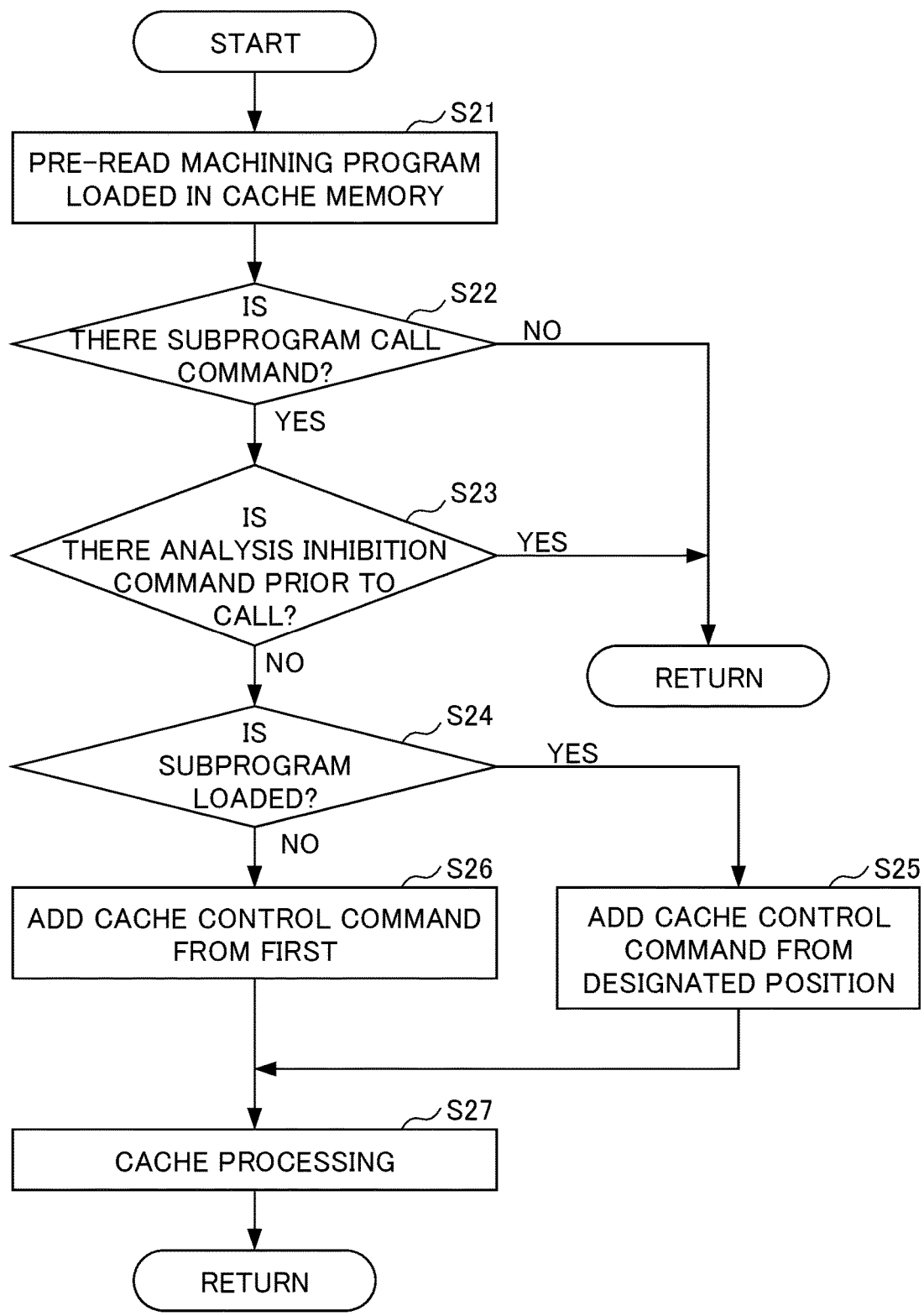
FIG. 3 is a flowchart showing search processing of a subprogram call command in the numerical control device in the present embodiment.

Next, control processing in the numerical control device 1 of the present embodiment will be described. FIGS. 2 and 3 are flowcharts showing the control processing in the numerical control device 1. For example, an operator turns on an unshown power supply of the numerical control device 1, and starts the numerical control device 1, so that in step S (hereinafter, "step S" will be referred to simply as "S") 11 of FIG. 2, the CPU 10 (the cache control unit 11) of the numerical control device 1 loads, in the cache memory 26, the machining program stored in the program storage section 22. In S12, the CPU 10 (the analysis unit 13) analyzes the machining program loaded in the cache memory 26 in S11.

Note that the CPU 10 (the analysis unit 13) transfers the command analyzed in S12 to the operation unit 18. Furthermore, the CPU 10 (the operation load determining section 14) may associate, with the command, the operation load on the CPU 10 when the command transferred to the operation unit 18 is executed, to store the operation load in the load information storage section 23. This processing causes the load information storage section 23 to store the measured value of the operation load for each command.

In S13, the CPU 10 (the operation load determining section 14) determines whether the operation load on the CPU 10 in the command included in the machining program loaded in the cache memory 26 is equal to or less than the prescribed value. If the operation load is equal to or less than the prescribed value (313: YES), the CPU 10 transfers the processing to S14. On the other hand, if the operation load is not equal to or not less than the prescribed value (S13: NO), the CPU 10 transfers the processing to S15. In S14, the CPU 10 pre-reads the command or the subsequent command, and performs search processing of the subprogram call command to search for the subprogram call command.

Here, description will be made as to the search processing of the subprogram call command, with reference to FIG. 3. In S21 of FIG. 3, the CPU 10 (the analysis unit 13) pre-reads the command or the subsequent command. Note that the block to be pre-read ahead is set in advance in the numerical control device 1. In S22, the CPU 10 (the call checking section 15) determines whether there is a subprogram call command. In a case where there is a subprogram call command (S22: YES), the CPU 10 transfers the processing to S23. On the other hand, in a case where there is not a subprogram call command (S22: NO), the CPU 10 transfers the processing to S15 of FIG. 2.

In S23, the CPU 10 (the control command adding section 16) determines whether there is an analysis inhibition command prior to the subprogram call command. In a case where there is an analysis inhibition command (S23: YES), the CPU 10 transfers the processing to S15 of FIG. 2. On the other hand, in a case where there is not an analysis inhibition command (S23: NO), the CPU 10 transfers the processing to S24. In S24, the CPU 10 (the control command adding section 16) determines whether the subprogram is already loaded in the cache memory 26. In a case where the subprogram is already loaded in the cache memory 26 (S24: YES), the CPU 10 transfers the processing to S25. On the other hand, in a case where the subprogram is not loaded in the cache memory 26 (S24: NO), the CPU 10 transfers the processing to S26.

In S25, the CPU 10 (the control command adding section 16) adds, to the command, the cache control command (the securing request) for the loading of the subprogram from the designated position into the cache memory 26. Here, in a case where the designated position is specified, the subprogram is from the designated position, and in a case where the designated position is not specified, the subprogram is from a first position. Thereafter, the CPU 10 transfers the processing to S27.

In S26, the CPU 10 (the control command adding section 16) adds, to the command, the cache control command (the securing request) for the loading of the subprogram from the first position into the cache memory 26. In S27, the CPU 10 (the cache control requesting section 17) makes the cache control request for the cache memory 26 to the cache control unit 11, responsive to the added cache control command (the securing request). Then, the CPU 10 (the cache control request processing section 12) performs cache processing of loading the subprogram in the cache memory 26, based on the cache control request. Thereafter, the CPU 10 transfers the processing to S15 of FIG. 2.

In S15 of FIG. 2, the CPU 10 determines whether to end the machining program. The operator performs, for example, an unshown reset operation of the numerical control device 1, so that the CPU 10 determines to end the machining program. In a case where the machining program is ended (S15: YES), the CPU 10 ends the present processing. On the other hand, in a case where the machining program is not ended (S15: NO), the CPU 10 transfers the processing to S12.

Specific Example 1

Figure 4A:
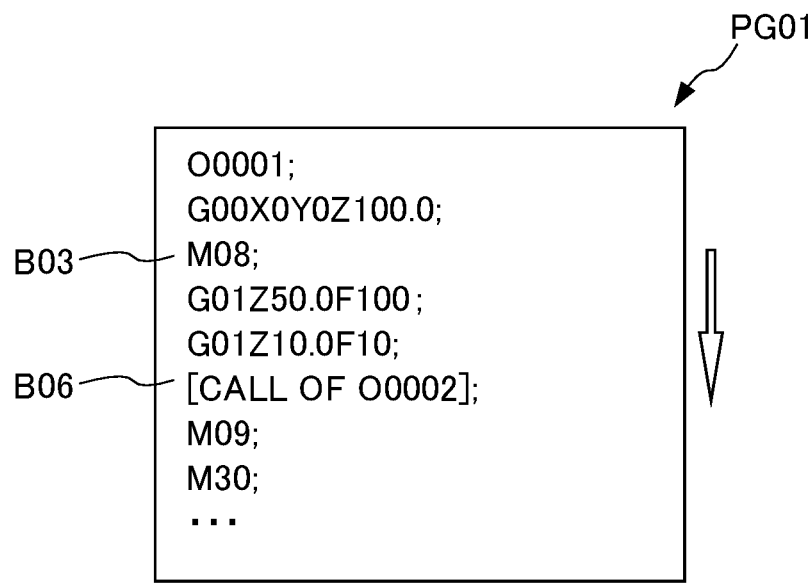
FIG. 4A is a diagram showing an example of a machining program in the present embodiment.
Figure 4B:
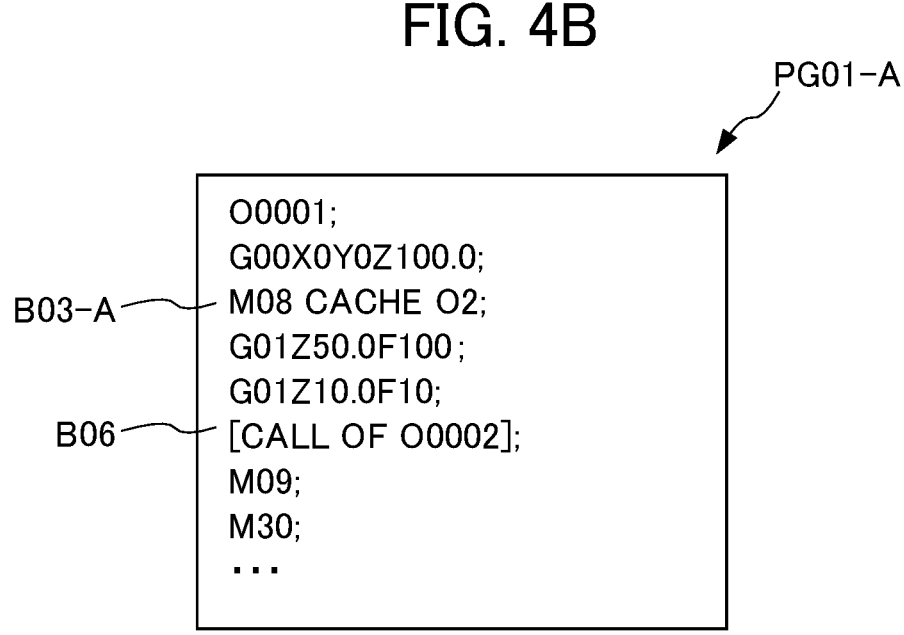
FIG. 4B is a diagram showing an example of the machining program in the present embodiment.

Next, description will be made as to adding processing of the cache control command based on a specific example. FIG. 4A shows an example of machining program PG01 that is "00001". The machining program PG01 is a program to perform processing in a unit of block responsive to a command described in a line. Here, block B03 indicates a command with the low operation load that is an operation load on the CPU 10 with a prescribed value or less. Note that "M08" is a command indicating that coolant (cooling water) is on. In this case, the CPU 10 pre-reads the machining program PG01 in a direction of an arrow of FIG. 4A (a downward direction). Then, the CPU 10 checks block B06 that is a call command of subprogram "00002". Thus, as shown in machining program PG01-A of FIG. 4B, the CPU 10 adds cache control command (securing request) "CACHE 02" for loading of the subprogram "00002" into the cache memory 26, to the command "M08" of the original block B03 (FIG. 4A), to change the block B03 to block B03-A. Consequently, the CPU 10 makes the cache control request for the cache memory 26, responsive to the cache control command (the securing request) added to the command, and performs cache processing of loading the subprogram in the cache memory 26 based on the cache control request. Therefore, when the command reaches the block B06, the subprogram is already loaded in the cache memory 26, and hence the processing can be efficiently performed.

Specific Example 2

Figure 5:
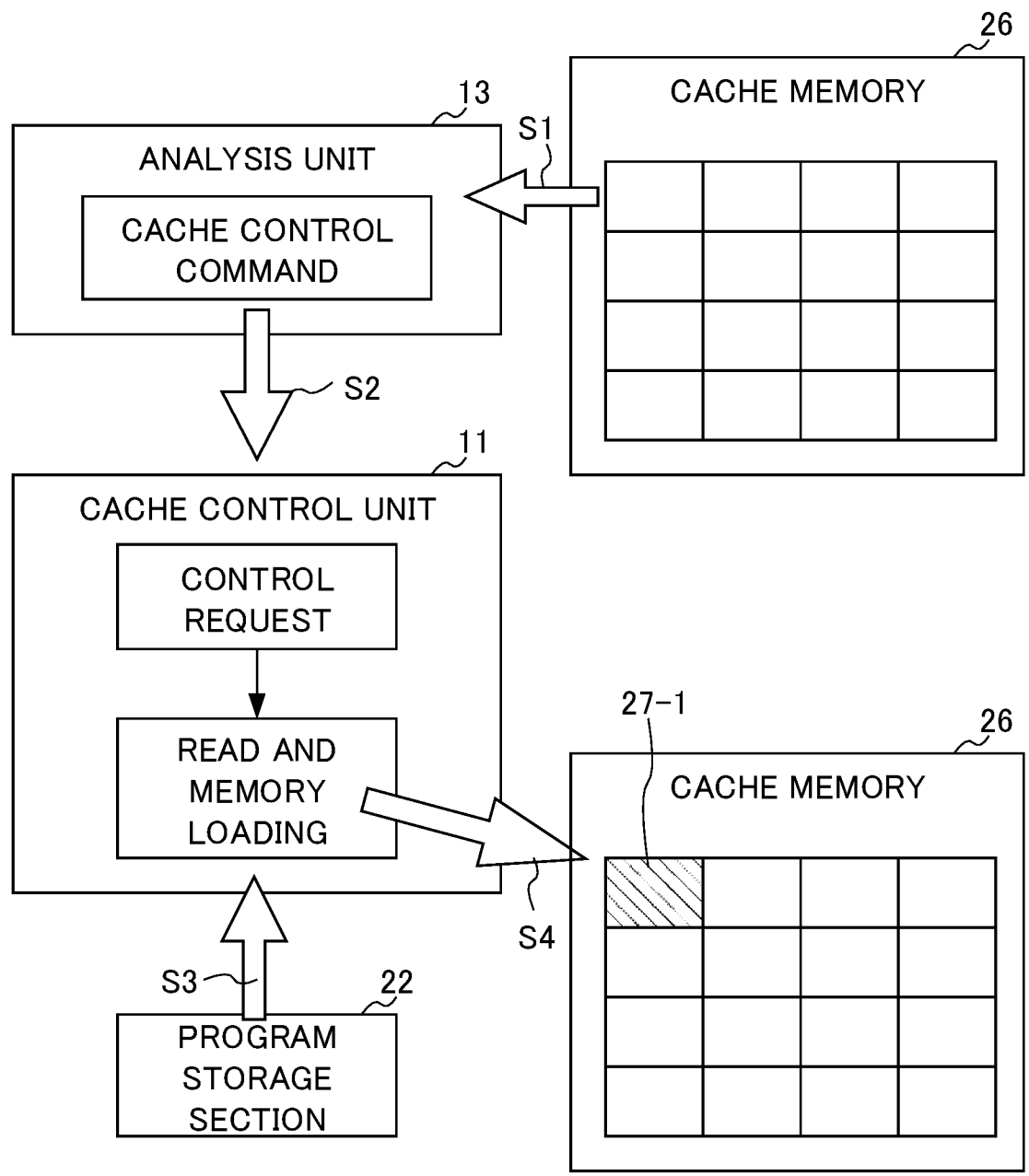
FIG. 5 is a diagram showing an example of loading processing into a cache memory in the present embodiment.

Next, description will be made as to loading processing to the cache memory 26. FIG. 5 shows an example in a case where any subprogram is not cached (loaded) in the cache memory 26. In this case, the analysis unit 13 checks the cache memory 26 (S1), and makes the cache control request to the cache control unit 11, responsive to the cache control command (the securing request) (S2). Upon receiving the cache control request, the cache control unit 11 reads the corresponding subprogram from the program storage section 22 (S3). Furthermore, the cache control unit 11 loads the read subprogram in the cache memory 26 (S4). Since any subprogram is not cashed in the cache memory 26 prior to the processing, the read subprogram is loaded in a first divided zone 27-1. Note that in a case where the subprogram has a certain size or more, data is divided in constant sizes, and the subprogram is then divided and loaded into a plurality of divided zones 27-*n* (n is a natural number).

Figure 6:
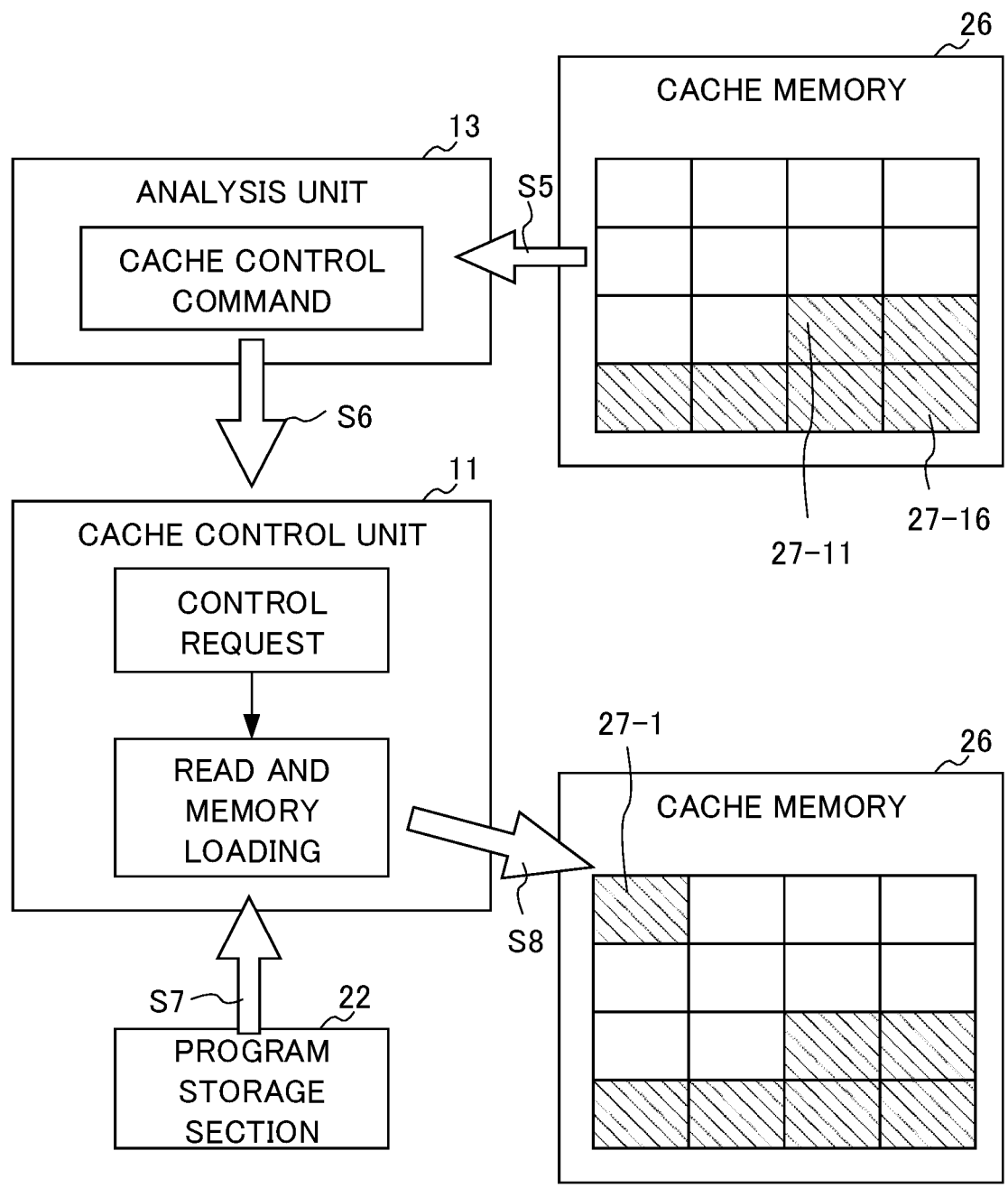
FIG. 6 is a diagram showing another example of the loading processing into the cache memory in the present embodiment.

On the other hand, description will be made as to a case where the subprogram is already cached in the cache memory 26, with reference to FIG. 6. In this case, the analysis unit 13 checks the cache memory 26 (S5), and makes the cache control request to the cache control unit 11, responsive to the cache control command (the securing request) (S6). Here, the subprogram is already loaded in divided zones 27-11 to 27-16, but there is not first data. Therefore, the cache control request responsive to the cache control command (the securing request) is a request for loading of the subprogram from the first data. Upon receiving the cache control request, the cache control unit 11 reads the corresponding machining program from the program storage section 22 (S7). Furthermore, the cache control unit 11 loads the read machining program in the cache memory 26 (S8). In this case, anything is not cached in the first divided zone 27-1 of the cache memory 26, and hence the read machining program is loaded in the first divided zone 27-1. Note that the already loaded subprogram may be erased before loading.

The program for use in each embodiment is stored by using any type of non-transitory computer readable medium, and can be supplied to a computer. The non-transitory computer readable medium includes various types of tangible storage mediums. Examples of the non-transitory computer readable medium include a magnetic recording medium (e.g., a flexible disk, a magnetic tape, and a hard disk drive), a photomagnetic recording medium (e.g., a photomagnetic disk) a CD-ROM (read only memory), a CD-R, a CD-R/W, and a semiconductor memory (e.g., a mask ROM, and a programmable ROM (PROM), an erasable PROM (EPROM), a flash ROM, and a random access memory (RAM)). Furthermore, the program may be supplied to the computer via any type of transitory computer readable medium. Examples of the transitory computer readable medium include an electric signal, an optical signal, and an electromagnetic wave. The transitory computer readable medium can supply the program to the computer via a wired communication path such as an electrical wire or an optical fiber, or a wireless communication path.

Additionally, the above described embodiment is one of preferred embodiments of the present invention, but a scope of the present invention is not limited only to the above embodiment, and the present invention can be implemented in variously changed aspects without departing from the scope of the present invention.

Modification Example 1

In the above described embodiment, the machine tool is illustrated as the industrial machine, and an example where the machine tool and the controller are separate devices has been described, but the present invention is not limited to this example. As described above, the machine tool and the controller may form an integral device. Furthermore, the controller may be, for example, a robot controller that controls an industrial robot, in place of the numerical control device. Additionally, the industrial machine may be, for example, the industrial robot, in place of the machine tool.

Modification Example 2

In the above described embodiment, a system (an operation unit) is not mentioned in particular, but the embodiment can be used even in a case where the machine tool includes a plurality of systems. In a case where there are a plurality of systems, various programs are used as the machining program. Even in this case, processing can be performed independently in each system. Specifically, it is considered that the machine tool includes, for example, two systems, and different machining programs are executed in the respective systems. In this case, each system can independently execute the machining program, and individually have, for example, a waiting command and an operation load. For example, a first system includes the waiting command and executes cache control, while a second system can continue operation independently of the cache control of the first system. Furthermore, in a case where the waiting command is found in the second system while the first system executes the cache control, the second system can execute cache control.

Modification Example 3

In the above embodiment, it has been described that the cache control command of the subprogram is added to the command with the low operation load (see FIG. 4B), but the present invention is not limited to this embodiment. For example, a cache control command of the subprogram may be added right before the command with the low operation load. Also, in this case, responsive to the command with the low operation load, the subprogram is cached, and hence, influence of machining processing can be suppressed.

As described above, according to the present embodiment, for example, the following operations and effects can be obtained.

(1) The numerical control device 1 that controls the machine tool 4 comprises the program storage section 22 that stores the machining program for operation of the machine tool 4, the cache memory 26 that stores the machining program read from the program storage section 22, the cache control unit 11 that controls writing into the cache memory 26 and discarding, and the analysis unit 13 that analyzes the machining program loaded in the cache memory 26, the analysis unit 13 comprises the operation load determining section 14 that determines whether the operation load on the CPU 10 in the command included in the machining program is below the prescribed value, the call checking section 15 that pre-reads a command subsequent to the command included in the machining program loaded in the cache memory 26, and checks whether a subprogram call command is present, in a case where the operation load determining section 14 determines that the operation load is below the prescribed value, the control command adding section 16 that adds, to the command, a cache control command for loading of the subprogram into the cache memory 26 in accordance with a predetermined condition, in a case where the call checking section 15 confirms presence of the subprogram call command, and the cache control requesting section 17 that makes the cache control request for the cache memory 26 to the cache control unit 11, responsive to the cache control command added by the cache control command adding section 16, and the cache control unit 11 comprises the cache control request processing section 12 that loads the subprogram in the cache memory 26, based on the cache control request by the cache control requesting section 17.

Consequently, the numerical control device 1 can load the subprogram in the cache memory 26, prior to the subprogram call command. Consequently, response time during call can be shortened. Furthermore, the numerical control device 1 sets timing of the cache control to time of the command with the low operation load, so that influence on machining processing can be reduced. Additionally, for example, if all is cached in the cache memory 26 at startup, startup time is influenced, but if the caching is performed during processing of the machining program, the startup time is not influenced, and unnecessary caching can be inhibited.

(2) The numerical control device 1 according to (1) may comprise the load information storage section 23 that stores the operation load on the CPU 10 for each command, and the operation load determining section 14 may determine whether the operation load on the CPU 10 is below the prescribed value, with reference to the load information storage section 23. Consequently, the command with the low operation load can be determined based on a measured value obtained from past operation history.

(3) In the numerical control device 1 according to (1) or (2), the control command adding section 16 may add the cache control command to the command as long as the analysis inhibition command is not present prior to the subprogram call command, in a case where the call checking section 15 confirms presence of the subprogram call command. Consequently, in a case where the analysis inhibition command is present, the pre-reading is prohibited, and hence the case can be excluded. Furthermore, in a case where the analysis inhibition command is not present, the subprogram can be loaded in the cache memory 26.

(4) In the numerical control device 1 according to any one of (1) to (3), the control command adding section 16 may determine whether a designated subprogram is already loaded in the cache memory 26, adds, to the command, the cache control command for loading of the subprogram from the first data into the cache memory 26, in a case where the subprogram is not loaded, and add, to the command, the cache control command for loading of the subprogram from a designated position into the cache memory 26, based on content of the subprogram call command, in a case where the subprogram is loaded. Consequently, in the case where the subprogram is not loaded in the cache memory 26, the subprogram can be loaded in the cache memory 26. Furthermore, even in the case where the subprogram is loaded in the cache memory 26, the program from the designated position can be loaded in the cache memory 26. Even in the case where the subprogram is loaded in the cache memory 26, for example, the subprogram from the designated position (including the first position) may not be present in the cache memory 26, or may be, for example, edited halfway, so that loaded information is not up to date. Also, in this case, the program from the designated position is loaded in the cache memory 26, and processing can be accurately performed.

(5) In the numerical control device 1 according to any one of (1) to (4), the machining program is executed in each of respective systems, and the processing by the cache control unit 11 and the analysis unit 13 may be performed for each system. Consequently, each system can independently perform the processing.

EXPLANATION OF REFERENCE NUMERALS

1 numerical control device
4 machine tool
10 CPU
11 cache control unit
12 cache control request processing section
13 analysis unit 14 operation load determining section
15 call checking section
16 control command adding section (cache control command adding section)
17 cache control requesting section
18 operation unit
20 storage unit
21 ROM
22 program storage section
23 load information storage section
25 RAM
26 cache memory
100 production system

What is claimed is:

1. A controller that controls an industrial machine, comprising:
   a storage area that stores an operation program for operation of the industrial machine;
   a cache memory that stores the operation program read from the storage area;
   a cache control unit that controls writing into the cache memory and discarding; and
   an analysis unit that analyzes the operation program loaded in the cache memory,
   the analysis unit comprising:
   an operation load determining section that determines whether an operation load on a CPU in a command included in the operation program is below a prescribed value;
   a call checking section that pre-reads a command subsequent to the command included in the operation program loaded in the cache memory, and checks whether a subprogram call command is present, in a case where the operation load determining section determines that the operation load is below the prescribed value;
   a cache control command adding section that adds, to the command, a cache control command for loading of the subprogram into the cache memory in accordance with a predetermined condition, in a case where the call checking section confirms presence of the subprogram call command; and
   a cache control requesting section that makes a cache control request for the cache memory to the cache control unit, responsive to the cache control command added by the cache control command adding section,
   the cache control unit comprising a cache control request processing section that loads the subprogram in the cache memory, based on the cache control request by the cache control requesting section.

2. The controller according to claim 1, comprising:
   a load information storage section that stores the operation load on the CPU for each command,
   wherein the operation load determining section determines whether the operation load on the CPU is below the prescribed value, with reference to the load information storage section.

3. The controller according to claim 1,
   wherein the cache control command adding section adds the cache control command to the command as long as an analysis inhibition command is not present prior to the subprogram call command, in a case where the call checking section confirms presence of the subprogram call command.

4. The controller according to claim 1,
   wherein the cache control command adding section determines whether a designated subprogram is already loaded in the cache memory, adds, to the command, the cache control command for loading of the subprogram from first data into the cache memory, in a case where the subprogram is not loaded, and adds, to the command, the cache control command for loading of the subprogram from a designated position into the cache memory, based on content of the subprogram call command, in a case where the subprogram is loaded.

5. The controller according to claim 1,
   wherein the operation program is executed in each of respective systems, and
   processing by the cache control unit and the analysis unit is performed for each system.

6. An industrial machine comprising the controller according to claim 1.

* * * * *